US009729796B1

(12) United States Patent
Chen et al.

(10) Patent No.: US 9,729,796 B1
(45) Date of Patent: Aug. 8, 2017

(54) METHOD AND APPARATUS FOR AUTOMATIC STAGE SCENE DETECTION

(71) Applicant: Motorola Mobility LLC, Chicago, IL (US)

(72) Inventors: Yin-Hu Chen, Deerfield, IL (US); Valeriy Marchevsky, Glenview, IL (US); Peter A Matsimanis, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/016,590

(22) Filed: Feb. 5, 2016

(51) Int. Cl.
*H04N 5/235* (2006.01)
*H04N 5/57* (2006.01)
*H04N 9/83* (2006.01)

(52) U.S. Cl.
CPC ......... *H04N 5/2352* (2013.01); *H04N 5/2351* (2013.01); *H04N 5/2356* (2013.01); *H04N 5/57* (2013.01); *H04N 5/2354* (2013.01); *H04N 9/833* (2013.01)

(58) Field of Classification Search
CPC .. H04N 5/2352; H04N 9/833; H04N 21/4852; H04N 5/253; H04N 5/57; H04N 5/2356
See application file for complete search history.

(56) References Cited

U.S. PATENT DOCUMENTS

| 8,023,996 | B2* | 9/2011 | Camp, Jr. | H04N 9/3173 345/589 |
| 8,154,650 | B2* | 4/2012 | Tsai | G06F 3/0488 348/371 |
| 8,786,767 | B2* | 7/2014 | Rihn | H04N 5/2256 348/207.1 |
| 2003/0174286 | A1* | 9/2003 | Trumbull | G06F 3/011 352/243 |
| 2009/0160944 | A1* | 6/2009 | Trevelyan | H04N 5/2354 348/187 |

OTHER PUBLICATIONS

Quoc Kien Vuong, et al., "A New Auto Exposure and Auto White-Balance Algorithm to Detect High Dynamic Range Conditions Using CMOS Technology", Proceedings of the World Congress on Engineering and Computer Science, Oct. 22-24, 2008, 5 pages.

(Continued)

*Primary Examiner* — Hung Lam
(74) *Attorney, Agent, or Firm* — Matthew C. Loppnow; Watson Intellectual Property Group

(57) ABSTRACT

A method and apparatus provide automatic stage scene detection. A first image of a scene can be captured using a frame luma for automatic exposure control. A brightness contrast can be calculated between a center region of the first image and areas surrounding the center region of the first image. A brightness value can be ascertained for the entire first image. The first image can be determined to be a stage scene image based on the brightness contrast being greater than a stage scene contrast threshold and the brightness value for the entire first image being less than a stage scene brightness value threshold. The frame luma for the automatic exposure control can be adjusted for correct exposure of the center region of the first image in response to determining the first image is a stage scene.

20 Claims, 6 Drawing Sheets

(56) References Cited

OTHER PUBLICATIONS

Radoslaw Mantiuk, et al., "Implementation of HDR Photographic Pipeline in Mobile Devices", 9th International Conference, ICIAR 2012, Proceedings Part 1, Jun. 25-27, 2012.
Jia Yi Liang, et al., "An Auto-exposure Algorithm for Detecting High Contrast Lighting Conditions", IEEE, Oct. 22-25, 2007, pp. 725-728.

* cited by examiner

| 0.533 | 0.533 | 0.533 | 0.533 | 0.533 | 0.533 | 0.533 | 0.533 |
| --- | --- | --- | --- | --- | --- | --- | --- |
| 0.533 | 0.533 | 0.533 | 0.533 | 0.533 | 0.533 | 0.533 | 0.533 |
| 0.533 | 0.533 | 2.40 | 2.40 | 2.40 | 2.40 | 0.533 | 0.533 |
| 0.533 | 0.533 | 2.40 | 2.40 | 2.40 | 2.40 | 0.533 | 0.533 |
| 0.533 | 0.533 | 2.40 | 2.40 | 2.40 | 2.40 | 0.533 | 0.533 |
| 0.533 | 0.533 | 2.40 | 2.40 | 2.40 | 2.40 | 0.533 | 0.533 |
| 0.533 | 0.533 | 0.533 | 0.533 | 0.533 | 0.533 | 0.533 | 0.533 |
| 0.533 | 0.533 | 0.533 | 0.533 | 0.533 | 0.533 | 0.533 | 0.533 |

METHOD AND APPARATUS FOR AUTOMATIC STAGE SCENE DETECTION

BACKGROUND

1. Field

The present disclosure is directed to a method and apparatus for automatic stage scene detection. More particularly, the present disclosure is directed to automatically detecting a stage scene and adjusting exposure to capture an image of the stage scene.

2. Introduction

Presently, people take pictures and videos using portable devices that have cameras. Such portable devices can include smartphones, tablet computers, flip phones, point and shoot cameras, DSLR cameras, laptop computers, and other portable devices that include cameras. These devices include automatic exposure control algorithms that automatically sets the exposure so the pictures and videos show proper illumination of the subject matter in a scene.

Unfortunately, automatic exposure control algorithms cannot account for stage scenes where a portion of a scene is brightly illuminated and the rest of the scene is dark. For example, performers on stage at a concert or in a club are brightly illuminated while the audience and surrounding areas are kept dark to focus the audience's attention on the performers. When an attendee attempts to take a picture, their device will consider both the dark areas and the light areas when setting the exposure of the camera. Because the camera sensor has a limited sensitivity range, both the light areas and the dark areas cannot be properly exposed at the same time. This results in the light area of the captured image being overblown and the dark area being underexposed when the device averages out the exposure of the two areas. This happens because the device does not know the scene is a stage scene where the subject of the scene is illuminated drastically brighter than the surrounding area.

Thus, there is a need for a method and apparatus for automatic stage scene detection.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for automatic stage scene detection. According to a possible embodiment, a first image of a scene can be captured using a frame luma for automatic exposure control. A brightness contrast can be calculated between a center region of the first image and areas surrounding the center region of the first image. A brightness value can be ascertained for the entire first image. The first image can be determined to be a stage scene image based on the brightness contrast being greater than a stage scene contrast threshold and the brightness value for the entire first image being less than a stage scene brightness value threshold. The frame luma for the automatic exposure control can be adjusted for correct exposure of the center region of the first image in response to determining the first image is a stage scene. A second image of the scene can be captured based on automatic exposure control using the adjusted frame luma.

Figures 1, 2:
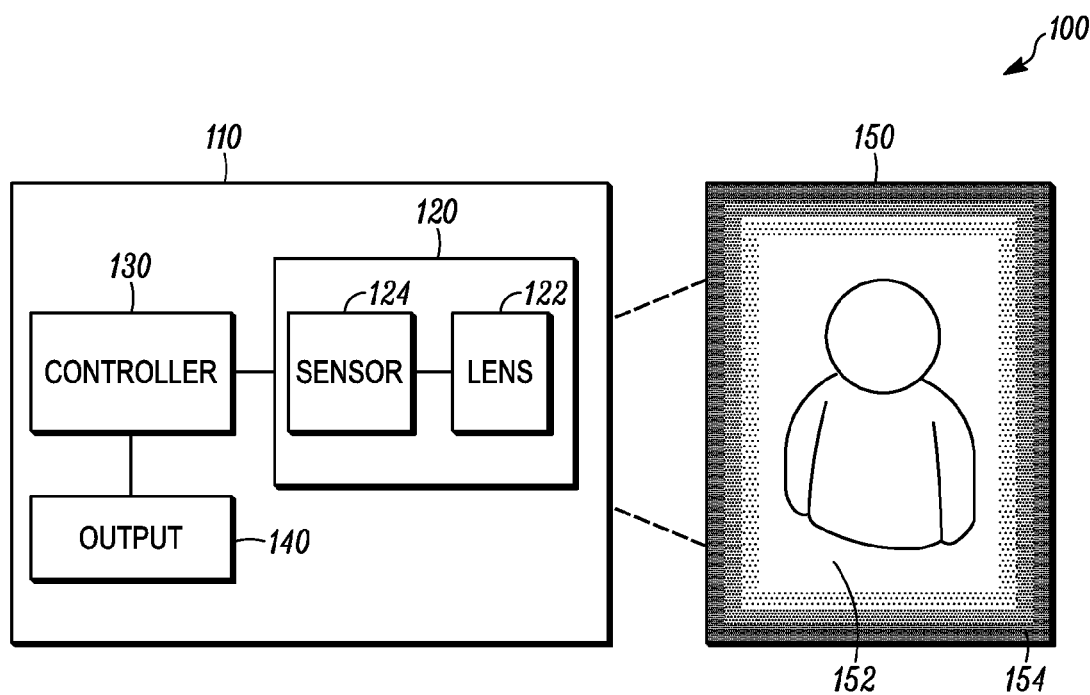
FIG. 1 is an example block diagram of a system according to a possible embodiment
FIG. 2 is an example illustration of regions of an image according to a possible embodiment.

FIG. 1 is an example block diagram of a system 100 according to a possible embodiment. The system 100 can include an apparatus 110 and a stage scene 150. The stage scene 150 can be an indoor stage scene, an outdoor stage scene at night, an amphitheater stage scene, a scene with a spotlight on a subject, or any other scene where a subject near the center 152 of scene is more brightly lit than the surrounding areas 154 of the scene. The apparatus 110 can be a wireless terminal, a portable wireless communication device, a smartphone, a cellular telephone, a flip phone, a personal digital assistant, a personal computer, a selective call receiver, a tablet computer, a laptop computer, a camera apparatus or any other device that is capable of capturing an image of a scene. The apparatus 110 can include a camera module 120, a controller 130, and an output 140. The controller 130 can be a microprocessor, a digital signal processor, an image processor, an image processing engine, a media processor, hardware, software, or any other device that can process an image. The camera module 120 can include a lens 122 and a sensor 124. The sensor 124 can be a Bayer grid sensor, a Red Green Blue Clear (RGBC) sensor, a luminance and chrominance sensor, such as a YUV sensor, an infrared sensor, a Complementary Metal Oxide Semiconductor (CMOS) sensor, a Charge-Coupled Device (CCD) sensor, and/or any other sensor that can be used to capture an image. The output 140 can be a display, can be an output from the controller 130 to a memory, can be a memory card reader output, can be a transceiver, can be a local port, and/or can be any other output that can output an image.

In operation, the sensor 124 can capture a first image of the scene 150 using a frame luma for automatic exposure control. The controller 130 can calculate a brightness contrast between a center region 152 of the first image and areas 154 surrounding the center region of the first image. The controller 130 can ascertain a brightness value for the entire first image. The controller 130 can determine the first image is a stage scene image based on the brightness contrast being greater than a stage scene contrast threshold and the brightness value for the entire first image being less than a stage scene brightness value threshold. The controller 130 can adjust the frame luma for the automatic exposure control for correct exposure of the center region of the first image in response to determining the first image is a stage scene. The sensor 124 can capture a second image of the scene based on automatic exposure control using the adjusted frame luma. The second image can be a still image or frame in a picture or a frame of multiple frames in a video.

FIG. 2 is an example illustration of regions of an image 200 according to a possible embodiment. A standard Automatic Exposure Control (AEC) algorithm runs on Bayer Grid (BG) stats of a Field of View (FOV) of the image 200. The BG stats can be divided by M×N regions, such as 64×48 regions and the average luminance (Y) for each region is be calculated from the BG stats (R,Gr,B,Gb). A normal standard AEC algorithm uses frame average or weighted, such as center weighted or spot weighted, luminance to calculate the frame luma from each region and its weighting with the following formula:

$$\text{Frame\_Luma} = \left[\frac{\Sigma(Ysum[i] \times W[i])}{\Sigma W[i]}\right],$$

where i represents each region. The AEC algorithm can use average luminance, center weighted luminance, such as where the center regions get a weighting of 2.40 and surrounding regions get a weighting of 0.533, spot weighted luminance, or other indicators of luminance to determine the frame luma. The AEC algorithm can compare the frame luma with pre-defined luma target. If the frame luma is within a tolerance, the AEC is settled and the algorithm can write the line-count and gain from a sensor-specific exposure table to the sensor 124 to control the sensitivity.

A standard AEC algorithm cannot handle a stage scene because the scene has very high dynamic range, with certain regions of the scene in low light or in the dark and some regions very bright. The normal standard AEC algorithm gives desired results only for the average or weighted frame luma, and is not capable of handling the high dynamic range scene of a stage scene, which can also be considered a concert scene, a spotlight scene, or other scene that has a high dynamic range between a bright central area and surrounding dark areas. For example, as stage scenes can happen indoors with certain proportion of the regions in low light or in the dark, a normal standard AEC will use longer exposure time, and will get the stage area highlight region totally over-blown. Thus, the AEC needs to handle stage scenes differently from other scenes to avoid impacting the other scenes. Embodiments can employ algorithm to detect and handle stage scenes automatically. This special handling of AEC enhancement can be used for the stage scenes, while the normal standard AEC can apply to all other scenes.

Figure 3:
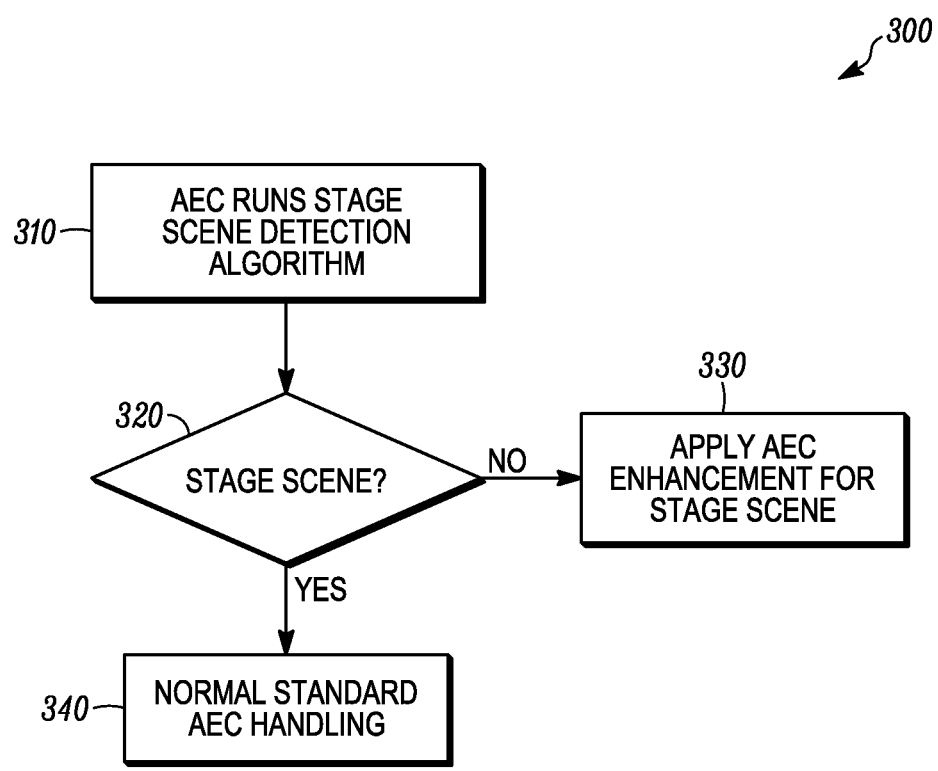
FIG. 3 is an example flowchart illustrating the operation of a portable device according to a possible embodiment.

FIG. 3 is an example flowchart 300 illustrating the operation of a portable device including a camera according to a possible embodiment. At 310, the AEC on the device can run a stage scene detection algorithm. At 320, the device can determine if the scene is a stage scene. At 330, if the scene is a stage scene, AEC enhancement can be applied for the stage scene. At 340, if the scene is not a stage scene, normal standard AEC can be applied.

Stage scenes have certain properties that can be used to determine if the scene is a stage scene. One property is that a stage scene has a very high dynamic range, with a central area very bright and surrounding areas dim or dark. Another property is that a stage scene is typically an indoor scene or night outdoor scene with a low overall Brightness Value (BV). Another property is that some regions are oversaturated in the central bright/highlight area. Another property is some regions in the surrounding shadow areas of a stage scene are dark. Some or all of these properties can be used to determine if a scene is a stage scene.

To automatically detect a stage scene, the brightness contrast ratio between the stage highlight area and the surrounding shadow area can be calculated to determine the high dynamic range level. Among the whole M×N grid BG stats, such as a 64×48 grid, of the FOV, an area can be defined that is used for stage highlight region, such as a 24×18 area for the region. The average Y of this 24×18 highlight regions can be calculated as Y_highlight and the average Y of the surrounding regions can be calculated as Y_shadow. The brightness contrast ratio, B_contrast, can be determined based on Y_highlight/Y_shadow.

Also, the Brightness Value (BV) of the whole frame or the exposure_index of the whole frame can be obtained from the normal standard AEC algorithm A typical stage scene happens indoor or at night, so use the BV value or exposure_index can be used to determine the scene is an indoor or outdoor stage scene based on overall brightness being low to differentiate the stage scene from otherwise bright scenes that are not stage scenes. As an alternate from normal standard AEC algorithm detecting the brightness for a stage scene, an Ambient Light Sensor (ALS) can be used to evaluate the ambient light brightness.

Additionally, a number of saturated regions can be calculated from the pre-defined highlight area, such as the 24×18 grid, from BG stats as stage_saturated_regions_num. For example, for each region of the pre-defined highlight area, such as in 24×18 regions, if the average Y of the region is bigger than certain threshold, such as 250 on a 0~255 scale of brightness, this region can be counted as saturated region, and stage_saturated_regions_num can be increased by 1.

Furthermore, the number of dark regions can be calculated from the surrounding shadow area from BG stats as stage_darkness_regions_num. For example, for each region of the surrounding area, such as in 64×48-24×18 regions, if the average Y of the region is less than certain threshold, such as 1 on a 0~255 scale of brightness, this region can be counted as dark region and stage_darkness_regions_num can be increased by 1.

Tunable parameters for can be defined for detection of a stage scene. These parameters can include stage_scene_contrast_threshold to check the dynamic range level, stage_scene_BV_threshold to check whether it is a stage scene with a low BV value, stage_scene_saturated_regions_threshold, to check whether the scene has a certain number of saturated regions, and stage_scene_darkness_regions_threshold, to check whether the scene has a certain number of dark regions.

The scene can classified as stage/concert scene if some or all the following conditions are met: the brightness contrast B_contrast is bigger than threshold stage_scene_contrast_threshold; the frame BV value is less than threshold Stage_scene_BV_threshold; the highlight area saturated regions number stage_saturated_regions_num is bigger than threshold stage_scene_saturated_regions_threshold; and/or the surrounding shadow area darkness regions number stage_darkness_regions_num is bigger than threshold Stage_scene_darkness_regions_threshold.

When a stage scene is detected, AEC enhancement methods can be used based on the luma target to get the stage area properly exposed. For example, the luma target can be decreased. With the lower luma target, the exposure integration time can be shorter and the bright highlight region of stage area can be properly exposed, instead of overexposed. As another example, the frame_luma can be calculated only based on the stage area and the dark surrounding area can be discarded from the calculated, which will make the stage area properly exposed as only stage area stats can be considered.

Figure 4:
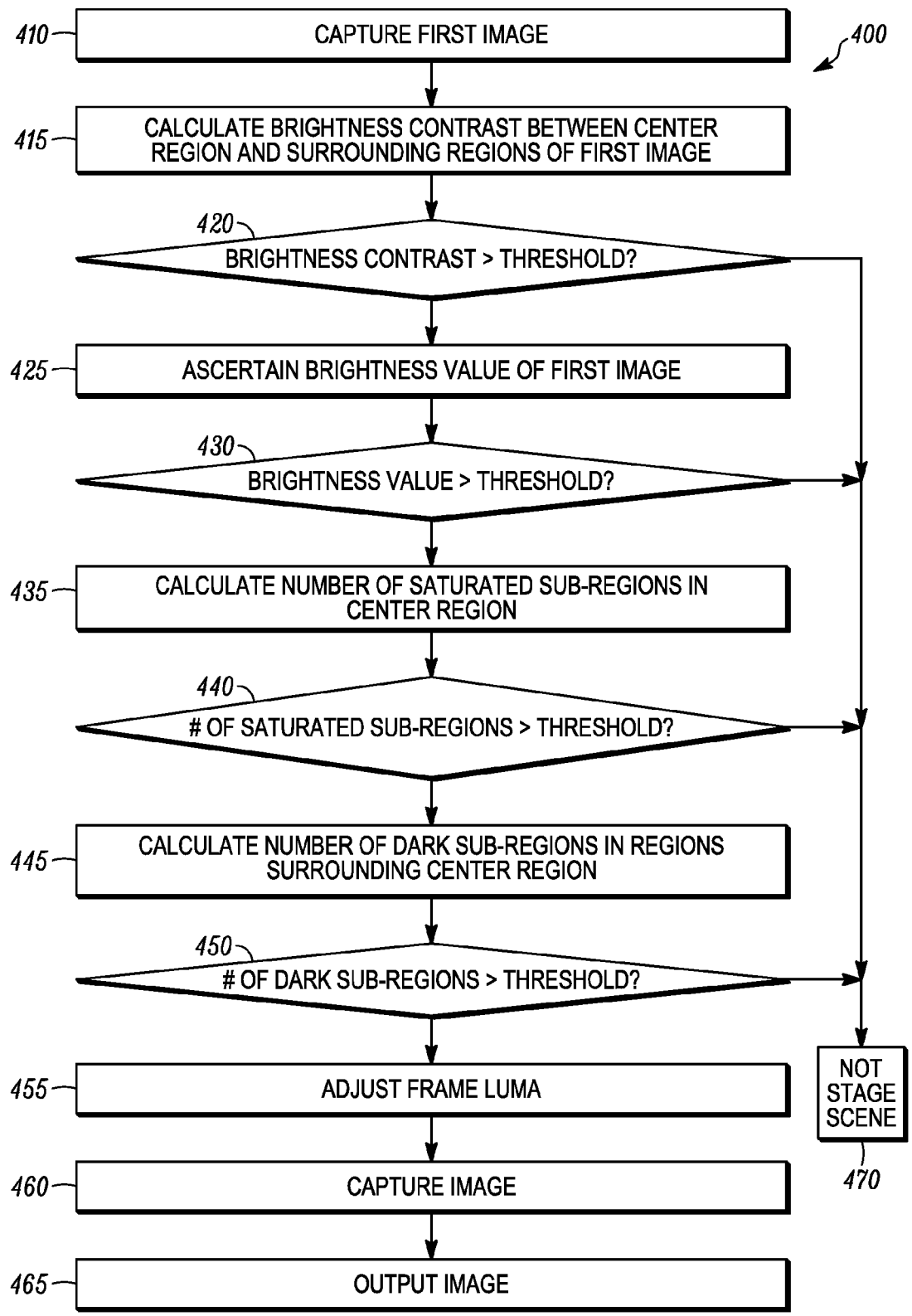
FIG. 4 is an example flowchart illustrating the operation of a portable device according to a possible embodiment.

FIG. 4 is an example flowchart 400 illustrating the operation of a portable device, such as the apparatus 110, according to a possible embodiment. The operation can be done in both non-zoom captures and zoom captures with different Bayer grid stats, grid sizes, RGBC stats, or other zoom captures. According to a possible embodiment, digital or optical zooming can be used on the subject of an image to reduce effects of the background and ensure the stage area of a scene fills most of the image.

At 410, a first image of a scene can be captured using a frame luma for automatic exposure control. The first image can be a preview image, a frame buffer image, or any other image that can be obtained from an image sensor to determine exposure.

At 415, a brightness contrast can be calculated between a center region of the first image and areas surrounding the center region of the first image. For example, a brightness contrast can be calculated between a central bright region and a surrounding dark region.

At 420, a determination can be made as to whether the brightness contrast is greater than a stage scene contrast threshold. For example, the brightness contrast can be compared to stage_scene_contrast_threshold. If it is greater, the flowchart 400 can advance to block 425. If not, the flowchart 400 can advance to block 470.

At 425, a brightness value can be ascertained for the entire first image. The brightness value can be any value representing brightness and can include an exposure index parameter, can be the result of a line count multiplied by sensor gain, can be a luminance parameter, or can be any other value that represents the brightness of a scene. According to a possible embodiment, the brightness value can be ascertained using an ambient light sensor to evaluate ambient light brightness for the brightness value. According to another possible embodiment, the brightness value can be ascertained from the first image without employing an ambient light sensor, such as by using an AEC algorithm.

At 430, a determination can be made as to whether the brightness value for the entire first image is less than a stage scene brightness value threshold. For example, the brightness value can be compare to stage_scene_BV_threshold. If it is less, the flowchart 400 can advance to block 435. If not, the flowchart 400 can advance to block 470.

At 435, a number of saturated sub-regions in the center region can be calculated. For example, the number of saturated sub-regions in the center region can be calculated by determining whether each sub-region in the center region has a brightness greater than a saturated sub-region brightness value threshold and then adding the number of sub-regions with a brightness greater than the saturated sub-region brightness value threshold to calculate the number of saturated sub-regions in the center region. For example, the center region can be broken up into a number of sub-regions and the average brightness of each sub-region can be compared to the saturated region brightness value threshold. As a further example, the number of saturated regions in a central highlight region can be calculated.

At 440, a determination can be made as to whether the number saturated sub-regions in the center region is higher than a saturated regions threshold. For example, the number of saturated sub-regions can be compared to Stage_scene_saturated_regions_threshold. If it is greater, the flowchart 400 can advance to block 445. If not, the flowchart 400 can advance to block 470.

At 445, a number of dark sub-regions in areas surrounding the center region can be calculated. For example, the dark sub-regions in the areas surrounding the center region can be calculated by determining whether each sub-region in the dark areas surrounding the center region has a brightness less than a dark sub-region brightness value threshold and then adding the number of sub-regions with a brightness less than the dark sub-region brightness value threshold to calculate the number of dark sub-regions in the areas surrounding the center region. As a further example, a number of dark regions of a surrounding shadow region can be calculated.

At 450, a determination can be made as to whether the number of dark sub-regions in the areas surrounding the center region is higher than a dark regions threshold. For example, the number of dark regions can be compared to Stage_scene_dark_regions_threshold. If it is greater, the flowchart 400 can advance to block 455. If not, the flowchart 400 can advance to block 470.

Each of the blocks above can be used to determine the first image is a stage scene image. However, while all of the determinations can be made to determine whether the first image is a stage scene image according a possible embodiment, not all determinations are necessary according to other embodiments.

At 455, the frame luma for the automatic exposure control can be adjusted for correct exposure of the center region of the first image in response to determining the first image is a stage scene. According to a possible embodiment, adjusting the frame luma for the automatic exposure control can include decreasing a target luma for proper exposure of the center region of the image. According to another possible embodiment, adjusting the frame luma for the automatic exposure control can include calculating the frame luma only based on the center region of the image for proper exposure of the center region of the image.

At 460, a second image of the scene can be captured based on automatic exposure control using the adjusted frame luma. At 465, the second image can be output. At 470, the flowchart 400 can determine the image is not of a stage scene and automatic exposure control can be performed without stage scene adjustments.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 5:
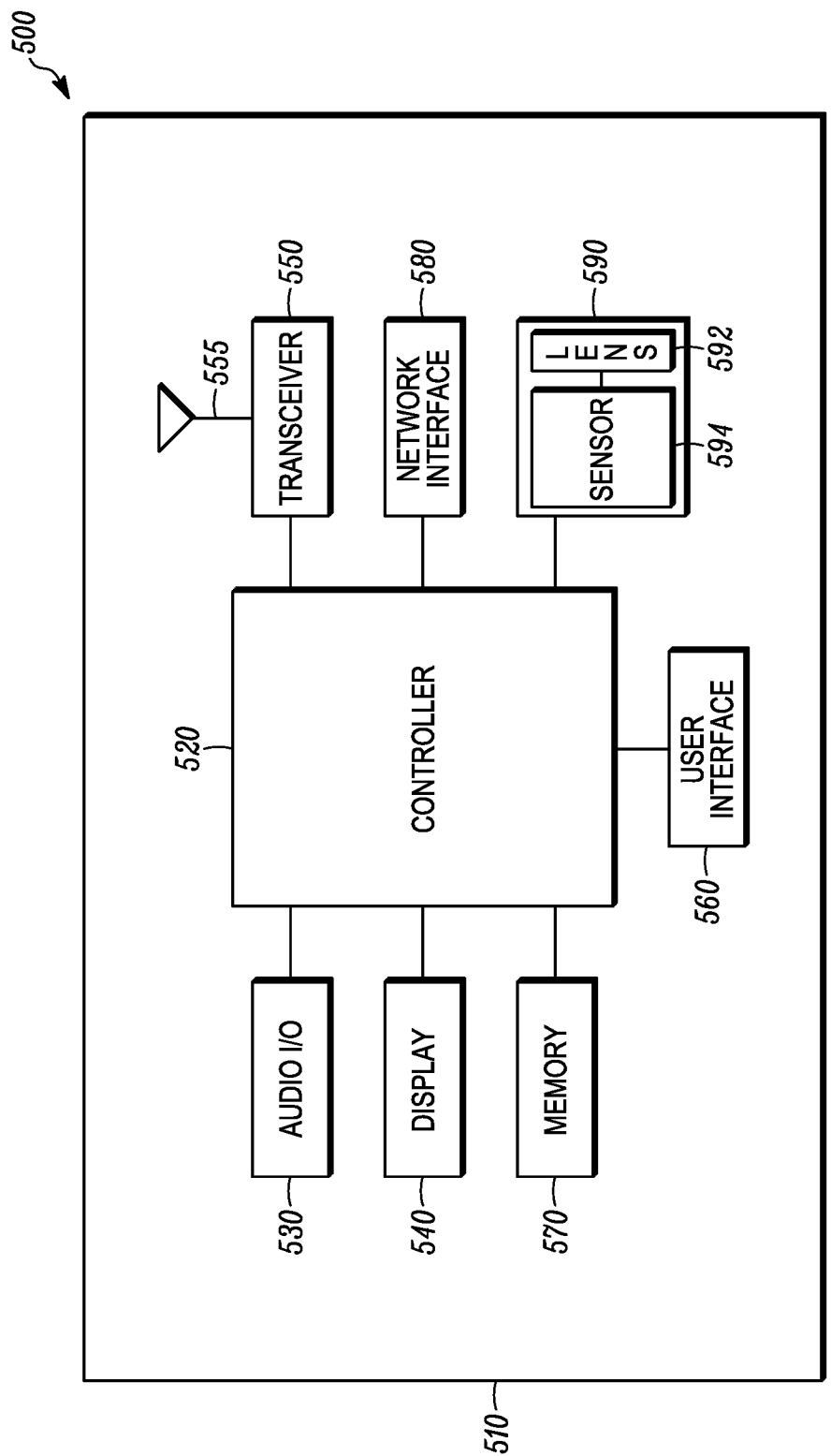
FIG. 5 is an example block diagram of an apparatus according to a possible embodiment.

FIG. 5 is an example block diagram of an apparatus 500, such as the apparatus 110, according to a possible embodiment. The apparatus 500 can include a housing 510, a controller 520 within the housing 510, audio input and output circuitry 530 coupled to the controller 520, a display 540 coupled to the controller 520, a transceiver 550 coupled to the controller 520, an antenna 555 coupled to the transceiver 550, a user interface 560 coupled to the controller 520, a memory 570 coupled to the controller 520, and a network interface 580 coupled to the controller 520. The apparatus 500 can also include a camera 590, such as the camera 120. The apparatus 500 can perform the methods described in all the embodiments.

The camera 590 can include a lens 592 and a sensor 594, such as the lens 122 and the sensor 124. The display 540 can be a viewfinder, a liquid crystal display (LCD), a light emitting diode (LED) display, a plasma display, a projection display, a touch screen, or any other device that displays information. The transceiver 550 can include a transmitter and/or a receiver. The audio input and output circuitry 530 can include a microphone, a speaker, a transducer, or any other audio input and output circuitry. The user interface 560 can include a keypad, a keyboard, buttons, a touch pad, a joystick, a touch screen display, another additional display, or any other device useful for providing an interface between a user and an electronic device. The network interface 580 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 570 can include a random access memory, a read only memory, an optical memory, a flash memory, a removable memory, a hard drive, a cache, or any other memory that can be coupled to a device.

The apparatus 500 or the controller 520 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 570 or elsewhere on the apparatus 500. The apparatus 500 or the controller 520 may also use hardware to implement disclosed operations. For example, the controller 520 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 520 may be any controller or processor device or devices capable of operating a device and implementing the disclosed embodiments.

In operation, the sensor 594 can capture, via the lens 592, a first image of a scene using a frame luma for automatic exposure control. The controller 520 can calculate a brightness contrast between a center region of the first image and areas surrounding the center region of the first image. The controller 520 can ascertain a brightness value for the entire first image. According to a possible embodiment, the controller 520 can ascertain a brightness value of the first image using an ambient light sensor to evaluate ambient light brightness for the brightness value. According to another possible embodiment, the controller 520 can ascertain a brightness value using an automatic exposure control process or any other way of ascertaining a brightness value of an image. The controller 520 can determine the first image is a stage scene image based on the brightness contrast being greater than a stage scene contrast threshold and the brightness value for the entire first image being less than a stage scene brightness value threshold.

According to a possible embodiment, the controller 520 can calculate a number of saturated sub-regions in the center region. According to a possible implementation, the controller 520 can calculate the number of saturated sub-regions in the center region by determining whether each sub-region in the center region has a brightness greater than a saturated sub-region brightness value threshold and adding the number of sub-regions with a brightness greater than the saturated sub-region brightness value threshold to calculate the number of saturated sub-regions in the center region. The controller 520 can determine the first image is a stage scene image based on the brightness contrast being greater than a stage scene contrast threshold, the brightness value for the entire first image being less than a stage scene brightness value threshold, and the number saturated sub-regions in the center region being higher than a saturated regions threshold.

According to a possible embodiment, the controller 520 can calculate a number of dark sub-regions in the areas surrounding the center region. According to a possible implementation, the controller 520 can calculate the dark sub-regions in the areas surrounding the center region by determining whether each sub-region in the dark areas has a brightness less than a dark sub-region brightness value threshold and adding the number of sub-regions with a brightness less than the dark sub-region brightness value threshold to calculate the number of dark sub-regions in the areas surrounding the center region. The controller 520 can determine the first image is a stage scene image based on the brightness contrast being greater than a stage scene contrast threshold, the brightness for the entire first image value being less than a stage scene brightness value threshold, and the number of dark sub-regions in the areas surrounding the center region being higher than a dark regions threshold.

The controller 520 can adjust the frame luma for the automatic exposure control for correct exposure of the center region of the first image in response to determining the first image is a stage scene. According to a possible embodiment, the controller 520 can adjust the frame luma for the automatic exposure control by decreasing a target luma for proper exposure of the center region of the image. According to another possible embodiment, the controller 520 can adjust the frame luma for the automatic exposure control by calculating the frame luma only based on the center region of the image for proper exposure of the center region of the image.

The sensor 594 can capture a second image of the scene based on automatic exposure control using the adjusted frame luma. The controller 520 can then output the second image via an output, such as the display 540, the transceiver 550, the network interface 580, an output to memory 570, or any other device for outputting an image.

Figure 6:
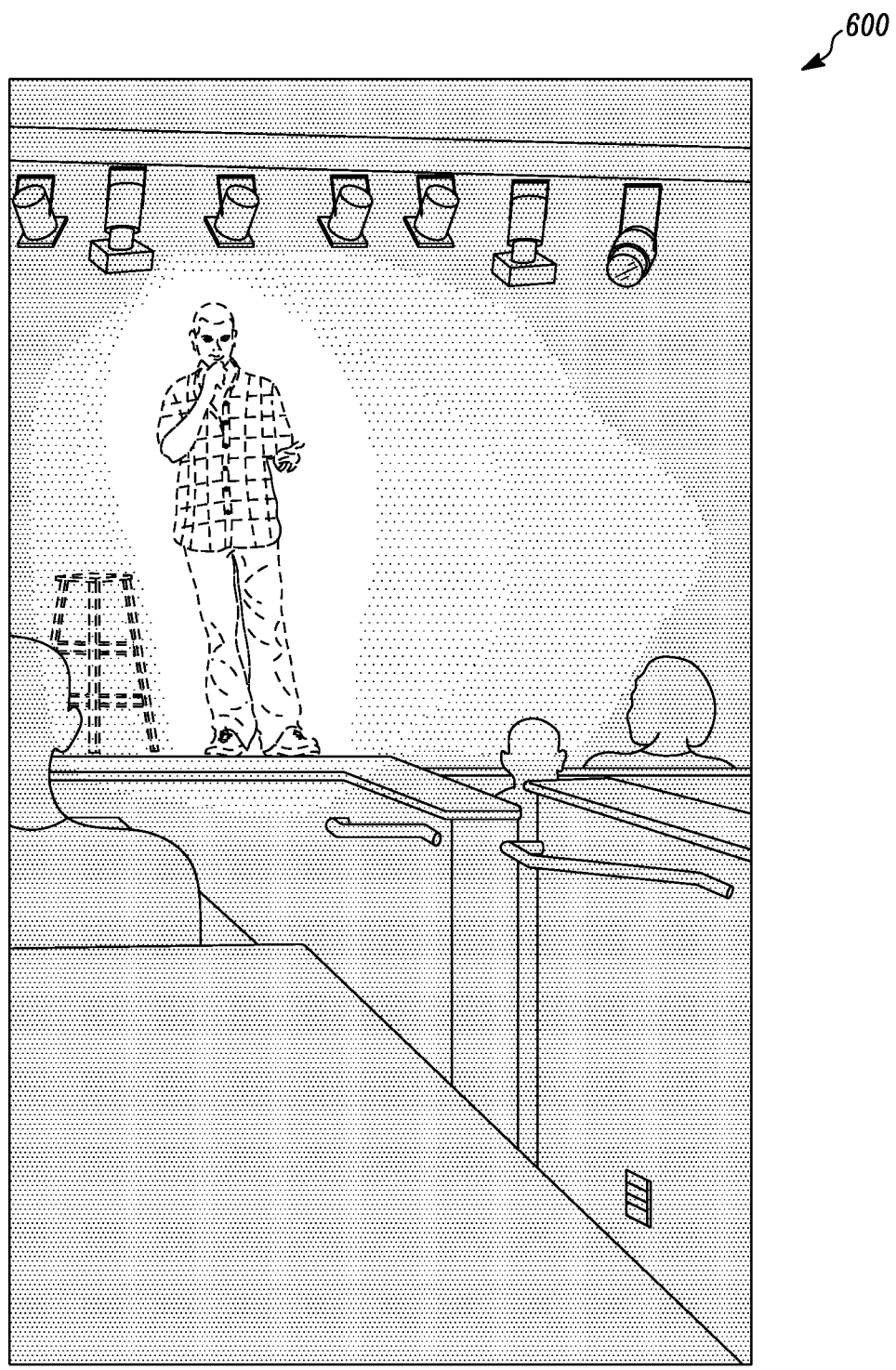
FIG. 6 is an example representation of an image captured without stage scene detection and compensation according to a possible embodiment.

FIG. 6 is an example representation of an image 600 captured without stage scene detection and compensation according to a possible embodiment. Without the stage scene detection and compensation of disclosed embodiments, the subject of the image 600 is overexposed and loses details that cannot be recovered.

Figure 7:
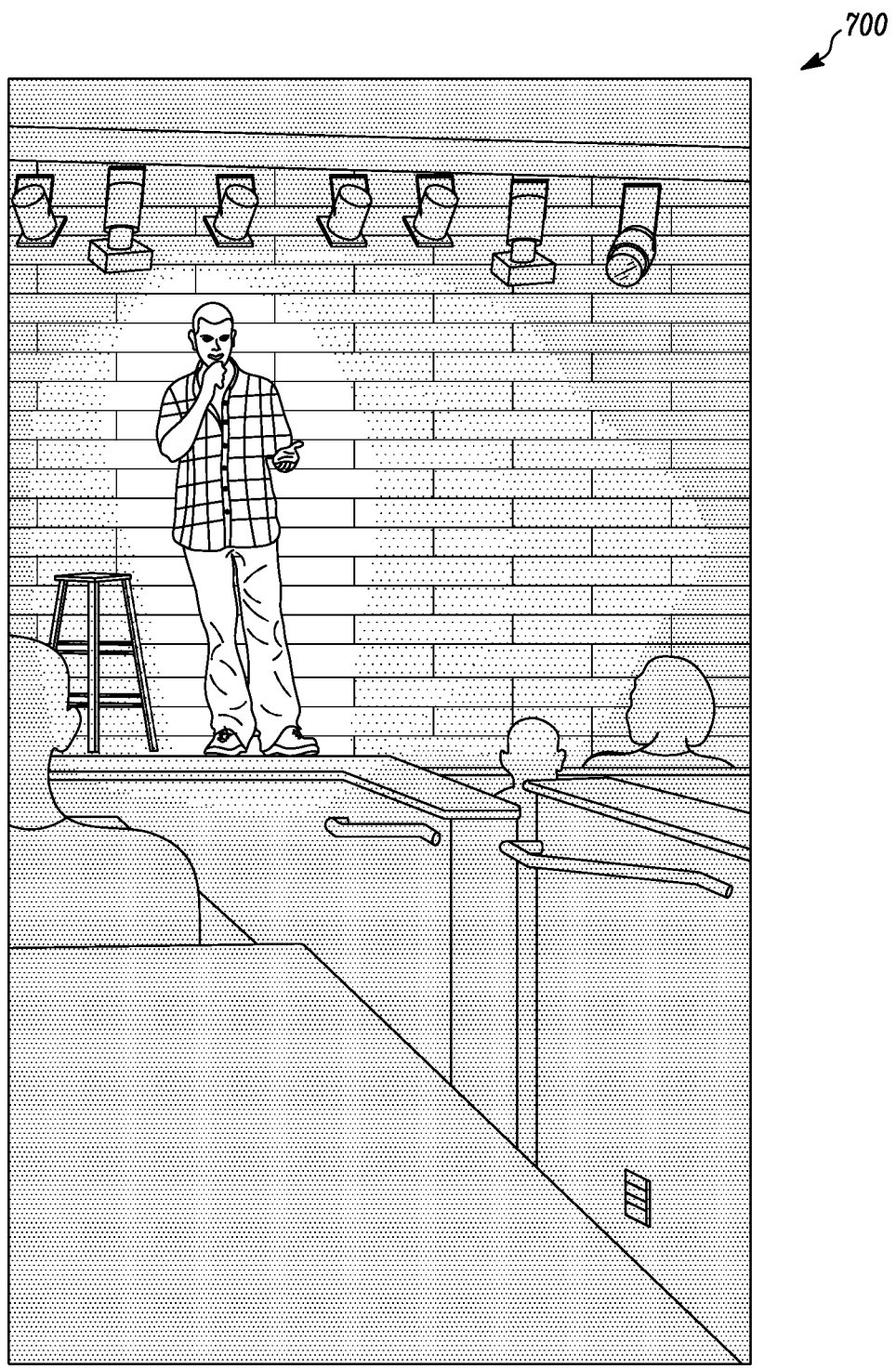
FIG. 7 is an example representation of an image captured with stage scene detection and compensation according to a possible embodiment.

FIG. 7 is an example representation of an image 700 captured with stage scene detection and compensation according to a possible embodiment. With the stage scene detection and compensation of disclosed embodiments, the subject of the image 700 is properly exposed.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
    capturing a first image of a scene using a frame luma for automatic exposure control;
    calculating a brightness contrast between a center region of the first image and areas surrounding the center region of the first image;
    ascertaining a brightness value for the entire first image;
    determining the first image is a stage scene image based on the brightness contrast being greater than a stage scene contrast threshold and the brightness value for the entire first image being less than a stage scene brightness value threshold;
    adjusting the frame luma for the automatic exposure control for correct exposure of the center region of the first image in response to determining the first image is a stage scene; and
    capturing a second image of the scene based on automatic exposure control using the adjusted frame luma.

2. The method according to claim 1, further comprising:
    calculating a number of saturated sub-regions in the center region,
    wherein determining comprises determining the first image is a stage scene image based on the brightness contrast being greater than a stage scene contrast threshold, the brightness for the entire first image value being less than a stage scene brightness value threshold, and the number saturated sub-regions in the center region being higher than a saturated regions threshold.

3. The method according to claim 2, wherein calculating the number of saturated sub-regions in the center region comprises:
    determining whether each sub-region in the center region has a brightness greater than a saturated sub-region brightness value threshold; and
    adding the number of sub-regions with a brightness greater than the saturated sub-region brightness value threshold to calculate the number of saturated sub-regions in the center region.

4. The method according to claim 1, further comprising:
    calculating a number of dark sub-regions in areas surrounding the center region,
    wherein determining comprises determining the first image is a stage scene image based on the brightness contrast being greater than a stage scene contrast threshold, the brightness value for the entire first image being less than a stage scene brightness value threshold, and the number of dark sub-regions in the areas surrounding the center region being higher than a dark regions threshold.

5. The method according to claim 4, wherein calculating the dark sub-regions in the areas surrounding the center region comprises:
    determining whether each sub-region in the dark areas surrounding the center region has a brightness less than a dark sub-region brightness value threshold; and
    adding the number of sub-regions with a brightness less than the dark sub-region brightness value threshold to calculate the number of dark sub-regions in the areas surrounding the center region.

6. The method according to claim 1, wherein adjusting the frame luma for the automatic exposure control comprises decreasing a target luma for proper exposure of the center region of the image.

7. The method according to claim 1, wherein adjusting the frame luma for the automatic exposure control comprises calculating the frame luma only based on the center region of the image for proper exposure of the center region of the image.

8. The method according to claim 1, wherein ascertaining a brightness value of the first image comprises ascertaining the brightness value using an ambient light sensor to evaluate ambient light brightness for the brightness value.

9. The method according to claim 1, further comprising outputting the second image.

10. An apparatus comprising:
    a sensor to capture a first image of a scene using a frame luma for automatic exposure control; and
    a controller to
        calculate a brightness contrast between a center region of the first image and areas surrounding the center region of the first image,
        ascertain a brightness value for the entire first image,
        determine the first image is a stage scene image based on the brightness contrast being greater than a stage scene contrast threshold and the brightness value for the entire first image being less than a stage scene brightness value threshold, and
        adjust the frame luma for the automatic exposure control for correct exposure of the center region of the first image in response to determining the first image is a stage scene,
    wherein the sensor captures a second image of the scene based on automatic exposure control using the adjusted frame luma.

11. The apparatus according to claim 10, wherein the controller calculates a number of saturated sub-regions in the center region, and
    determines the first image is a stage scene image based on the brightness contrast being greater than a stage scene contrast threshold, the brightness value for the entire first image being less than a stage scene brightness value threshold, and the number saturated sub-regions in the center region being higher than a saturated regions threshold.

12. The apparatus according to claim 11, wherein the controller calculates the number of saturated sub-regions in the center region by
    determining whether each sub-region in the center region has a brightness greater than a saturated sub-region brightness value threshold, and
    adding the number of sub-regions with a brightness greater than the saturated sub-region brightness value threshold to calculate the number of saturated sub-regions in the center region.

13. The apparatus according to claim 10, wherein the controller
    calculates a number of dark sub-regions in the areas surrounding the center region, and
    determines the first image is a stage scene image based on the brightness contrast being greater than a stage scene contrast threshold, the brightness for the entire first image value being less than a stage scene brightness value threshold, and the number of dark sub-regions in the areas surrounding the center region being higher than a dark regions threshold.

14. The apparatus according to claim 13, wherein the controller calculates the dark sub-regions in the areas surrounding the center region by
    determining whether each sub-region in the dark areas has a brightness less than a dark sub-region brightness value threshold, and
    adding the number of sub-regions with a brightness less than the dark sub-region brightness value threshold to calculate the number of dark sub-regions in the areas surrounding the center region.

15. The apparatus according to claim 10, wherein the controller adjusts the frame luma for the automatic exposure control by decreasing a target luma for proper exposure of the center region of the image.

16. The apparatus according to claim 10, wherein the controller adjusts the frame luma for the automatic exposure control by calculating the frame luma only based on the center region of the image for proper exposure of the center region of the image.

17. The apparatus according to claim 10, wherein the controller ascertains a brightness value of the first image using an ambient light sensor to evaluate ambient light brightness for the brightness value.

18. The apparatus according to claim 10, further comprising an output to output the second image.

19. The apparatus according to claim 10, wherein the apparatus comprises a smartphone.

20. A method comprising:
    capturing a first image of a scene using a frame luma for automatic exposure control;
    calculating a brightness contrast between a bright center region of the first image and dark areas surrounding the center region of the first image;
    ascertaining a brightness value for the entire first image;
    calculating a number of saturated sub-regions in the center region;
    calculating a number of dark sub-regions in the dark areas surrounding the center region;
    determining the first image is a stage scene image based on the brightness contrast being greater than a stage scene contrast threshold, the brightness value for the entire first image being less than a stage scene brightness value threshold, the number saturated sub-regions in the center region being higher than a saturated regions threshold, and the number of dark sub-regions in the dark areas being higher than a dark regions threshold;
    adjusting the frame luma for the automatic exposure control for correct exposure of the center region of the first image in response to determining the first image is a stage scene;
    capturing a second image of the scene based on automatic exposure control using the adjusted frame luma; and
    outputting the second image.

\* \* \* \* \*